(12) United States Patent
Nishiji et al.

(10) Patent No.: US 6,729,991 B1
(45) Date of Patent: May 4, 2004

(54) COMBINED DIFFERENTIAL GEAR DEVICE

(75) Inventors: Makoto Nishiji, Kumagaya (JP); Shinichiro Nakajima, Brussels (BE)

(73) Assignee: Bosch Automotive Systems Corporation, Tokyo (JP)

( * ) Notice: Subject to any disclaimer, the term of this patent is extended or adjusted under 35 U.S.C. 154(b) by 10 days.

(21) Appl. No.: 10/149,572

(22) PCT Filed: Jun. 15, 2000

(86) PCT No.: PCT/JP00/03928

§ 371 (c)(1), (2), (4) Date: Jun. 12, 2002

(87) PCT Pub. No.: WO01/44691

PCT Pub. Date: Jun. 21, 2001

Related U.S. Application Data

(60) Provisional application No. 60/172,524, filed on Dec. 17, 1999.

(51) Int. Cl.[7] .............................................. F16H 48/08
(52) U.S. Cl. ....................................... 475/221; 475/204
(58) Field of Search ................................ 475/198, 204, 475/205, 221

(56) References Cited

U.S. PATENT DOCUMENTS

| | | | |
|---|---|---|---|
| RE23,691 E | * 7/1953 | Randol | 475/204 X |
| 4,207,780 A | 6/1980 | Saxton | 74/710.5 |
| 4,625,585 A | 12/1986 | Dissett | 74/715 |
| 4,817,753 A | * 4/1989 | Hiketa | 475/221 X |
| 5,176,589 A | 1/1993 | Borgudd | 475/221 |
| 5,533,943 A | * 7/1996 | Ichioka et al. | 475/198 |
| 5,547,430 A | * 8/1996 | Gasch | 475/221 X |
| 5,554,080 A | * 9/1996 | Dangel | 475/204 |
| 5,902,206 A | 5/1999 | Oda et al. | 475/221 |
| 6,074,321 A | * 6/2000 | Maeda et al. | 475/221 |
| 6,117,038 A | * 9/2000 | Nishiji et al. | 475/221 |

FOREIGN PATENT DOCUMENTS

| | | |
|---|---|---|
| DE | 36 00 385 A1 | 9/1986 |
| EP | 0 043 806 A1 | 7/1981 |
| EP | 0 043806 A1 | 1/1982 |
| EP | 0 857 892 A1 | 9/1997 |
| FR | 2700302 * 7/1994 | 475/221 |
| GB | 952861 | 3/1964 |
| JP | 59-057032 A | 4/1984 |
| JP | 401172025 * 7/1989 | 475/221 |
| JP | 11-257463 A | 9/1999 |

* cited by examiner

*Primary Examiner*—Ha Ho
(74) *Attorney, Agent, or Firm*—Brian B. Shaw, Esq.; Thomas B. Ryan; Harter, Secrest & Emery LLP

(57) ABSTRACT

A housing (10) has a planetary gear mechanism (20) composed of an inner gear (21), a planetary gear (22) and a sun gear (23), which mechanism is disposed within the housing (10) on its outer periphery side. The inner gear (21) is connected with a casing (31) arranged on a rotation axis (L). A spherical receiving portion (31a) is formed on the casing (31). This receiving portion (31a) is received in the sun gear (23). A pair of element gears (33, 33) and a pair of side gears (34, 34) of the planetary gear mechanism (30) are received in the receiving portion (31a).

16 Claims, 10 Drawing Sheets

COMBINED DIFFERENTIAL GEAR DEVICE

CROSS REFERENCE TO RELATED APPLICATION

This application claims the benefit of U.S. Provisional Patent Application serial No. 60/172,524 filed Dec. 17, 1999, which is incorporated herein by reference in its entirety.

TECHNICAL FIELD

This invention relates to a combined differential gear device in which a planetary gear mechanism and a differential gear mechanism are incorporated in a housing.

Background Art

A four-wheel drive vehicle having a front transverse engine includes a front differential gear device connected to a front accelerator shaft, a rear differential gear device connected to a rear accelerator shaft, and a sort of coupling for transmitting power from a transmission to the front and rear differential gear devices and absorbing differential rotation between the front and rear differential gear devices. A center differential gear device is a desirable means for normally distributing power to the front differential gear device and to the rear differential gear device. However, the four-wheel drive vehicle having the front transverse engine occasionally does not have a space enough to install a one-input two-output mechanism which is necessary for the center differential gear device.

U.S. Pat. No. 5,484,348 discloses a combined differential gear device in which a differential gear mechanism and a planetary gear mechanism are incorporated in a housing. In case this combined differential gear device is applied to a four-wheel drive vehicle having a front transverse engine, the differential gear mechanism is used as a center differential gear device and the planetary gear mechanism is used as a front differential gear device. Therefore, this combined differential gear device can considerably solve the differential gear device and the front differential gear device, another problem is arisen in which the manufacturing cost is increased.

DISCLOSURE OF THE INVENTION

An object of the present invention is to provide a combined differential gear device in which a large chamfering can be formed on a housing.

In order to achieve this object, a first mode of the present invention relates to a combined differential gear device including a hollow housing which is rotation-driven about a rotation axis, and a planetary gear mechanism and a differential gear mechanism which are disposed within the housing, wherein the planetary gear mechanism includes an inner gear rotatably disposed within the housing with an axis thereof aligned with the rotation axis, a sun gear rotatably disposed within the housing with an axis thereof aligned with the rotation axis and with at least a part thereof inserted in the inner gear, and a planetary gear disposed within the housing such that the planetary gear is rotatable about its own axis, the planetary gear being capable of revolving about the rotation axis together with the housing and engaged with the inner gear and the sun gear, at least a part of the sun gear inserted in the inner gear being provided with a hollow portion, and wherein the differential gear mechanism includes a hollow casing rotatably disposed within the sun gear about the rotation axis and connected to the inner gear so as to be rotated in unison with the inner gear, an element gear disposed within the casing such that the element gear is rotatable about its own axis, the element gear being capable of revolving about the rotation axis together with the casing, and a pair of side gears rotatably disposed within the casing with axes thereof aligned with the rotation axis and engaged with the element gear. above-mentioned problem in that there is no space enough to install the center differential gear device.

Requirements for an arrangement of a front differential gear device in a front-wheel drive vehicle having a front transverse engine are; height from the ground surface, position in a forward/backward direction for achieving reduction of the overhang weight and an arrangement in a left/right direction between two accelerator shafts. In order to satisfy those requirements as much as possible, a large external chamfering is formed on the housing of the front differential gear device. This large external chamfering is placed in opposing relation to a similar chamfering of a torque converter or clutch. This requirement must also be satisfied in order to accomplish a four-wheel drive vehicle by installing a combined differential gear device in a space for the front differential gear device.

However, the differential gear mechanism of the combined differential gear device disclosed in the above-mentioned U.S. Pat. No. 5,484,348 has a pair of side gears arranged on a rotation axis of a housing. A planetary gear mechanism is disposed within one of the side gears. So, this side gear has a comparatively large diameter. The other side gear also has a large diameter corresponding to the diameter of the first-mentioned side gear. The two side gears, each having a large diameter, are arranged side by side in an axial direction of the housing. Moreover, a pair of planetary gears to be engaged with the corresponding side gears are arranged on an outer periphery side thereof. Unless a large number of such planetary gears are arranged in the circumferential direction, it becomes necessary, in order to obtain a sufficient strength, to increase the tooth-width of each side gear and thus, to increase the tooth-width of each planetary gear. This results in a problem that a large chamfering is difficult to be formed on the housing. Moreover, since a large number of planetary gears become necessary to be used on both the center In the first mode of the present invention, it is accepted that the planetary gear is rotatably received in a pocket formed in the housing or the planetary gear is rotatably supported on the housing through a shaft. Preferably, bevel gears are used as the element gear and as the side gear, and the element gear is arranged with an axis thereof orthogonal to the rotation axis. It is also preferred that a tapered chamfering is formed on one end portion of the housing.

A second mode of the present invention relates to a combined differential gear device including a hollow housing which is rotation-driven about a rotation axis, and a planetary gear mechanism and a differential gear mechanism which are disposed within the housing, wherein the planetary gear mechanism includes an inner gear rotatably disposed within the housing with an axis thereof aligned with the rotation axis, a sun gear rotatably disposed within the housing with an axis thereof aligned with the rotation axis and with at least a part thereof inserted in the inner gear, and a planetary gear disposed within the housing such that the planetary gear is rotatable about its own axis, the planetary gear being capable of revolving about the rotation axis together with the housing and engaged with the inner gear and the sun gear, at least a part of the sun gear inserted in the inner gear being provided with a hollow portion, and wherein the differential gear mechanism includes a hollow casing rotatably disposed within the sun gear about the rotation axis and connected to the sun gear so as to be rotated in unison with the sun gear, an element gear disposed within the casing such that the element gear is rotatable about its own axis, the element gear being capable of revolving about the rotation axis together with the casing, and a pair of side gears rotatably disposed within the casing with axes thereof aligned with the rotation axis and engaged with the element gear.

In the second mode of the present invention, it is accepted that the planetary gear is rotatably received in a pocket formed in the housing or the planetary gear is rotatably supported on the housing through a shaft extending in parallel to the rotation axis. Preferably, bevel gears are used as the element gear and as the side gear, and the element gear is arranged with an axis thereof orthogonal to the rotation axis. Preferably, a tapered chamfering is formed on one end portion of the housing.

A third mode of the present invention relates to a combined differential gear device including a hollow housing which is rotation-driven about a rotation axis, and a planetary gear mechanism and a differential gear mechanism which are disposed within the housing, wherein the planetary gear mechanism includes an inner gear disposed within the housing with an axis thereof aligned with the rotation axis and rotated in unison with the housing, a sun gear rotatably disposed within the housing with an axis thereof aligned with the rotation axis and with at least a part thereof inserted in the inner gear, a carrier rotatably disposed within the housing with an axis thereof aligned with the rotation axis, and a pair of planetary gears disposed on the carrier such that the planetary gears are rotatable about their own axes, the planetary gears being capable of revolving about the rotation axis in unison with the carrier, the planetary gears being engaged with each other and also engaged with the inner gear and the sun gear, at least a part of the sun gear inserted in the inner gear being provided with a hollow portion, and wherein the differential gear mechanism includes an element gear disposed within the sun gear such that the element gear is rotatable about its own axis, the element gear being capable of revolving about the rotation axis together with the sun gear, and a pair of side gears rotatably disposed within the sun gear with axes thereof aligned with the rotation axis and engaged with the element gear.

In the third mode of the present invention, it is preferred that the pair of planetary gears are rotatably received in pockets, respectively, which are formed in the carrier. However, it is accepted that the pair of planetary gears are rotatably supported on the carrier through a shaft. Preferably, bevel gears are used as the element gear and as the side gear, and the element gear is arranged with an axis thereof orthogonal to the rotation axis. It is also preferred that a tapered chamfering is formed on one end portion of the housing.

A fourth mode of the present invention relates to a combined differential gear device including a hollow housing which is rotation-driven about a rotation axis, and a planetary gear mechanism and a differential gear mechanism which are disposed within the housing, wherein the planetary gear mechanism includes an inner gear rotatably disposed within the housing with an axis thereof aligned with the rotation axis and rotated in unison with the housing, a sun gear rotatably disposed within the housing with an axis thereof aligned with the rotation axis and with at least a part thereof inserted in the inner gear, a carrier rotatably disposed within the housing with an axis thereof aligned with the rotation axis and connected to the inner gear so as to be rotated in unison therewith, and a pair of planetary gears disposed on the carrier such that the planetary gears are rotatable about their own axes, the planetary gears being capable of revolving about the rotation axis in unison with the carrier, the planetary gears being engaged with each other and also engaged with the inner gear and the sun gear, at least a part of the sun gear inserted in the inner gear being provided with a hollow portion, and wherein the portion of the carrier inserted in the sun gear is provided with a hollow portion, the differential gear mechanism includes an element gear disposed within the carrier such that the element gear is rotatable about its own axis, the element gear being capable of revolving about the rotation axis together with the carrier, and a pair of side gears rotatably disposed within the carrier with axes thereof aligned with the rotation axis and engaged with the element gear.

In the fourth mode of the present invention, it is preferred that a tapered chamfering is formed on one end portion of the housing.

BEST MODE FOR CARRYING OUT THE INVENTION

Figure 1:
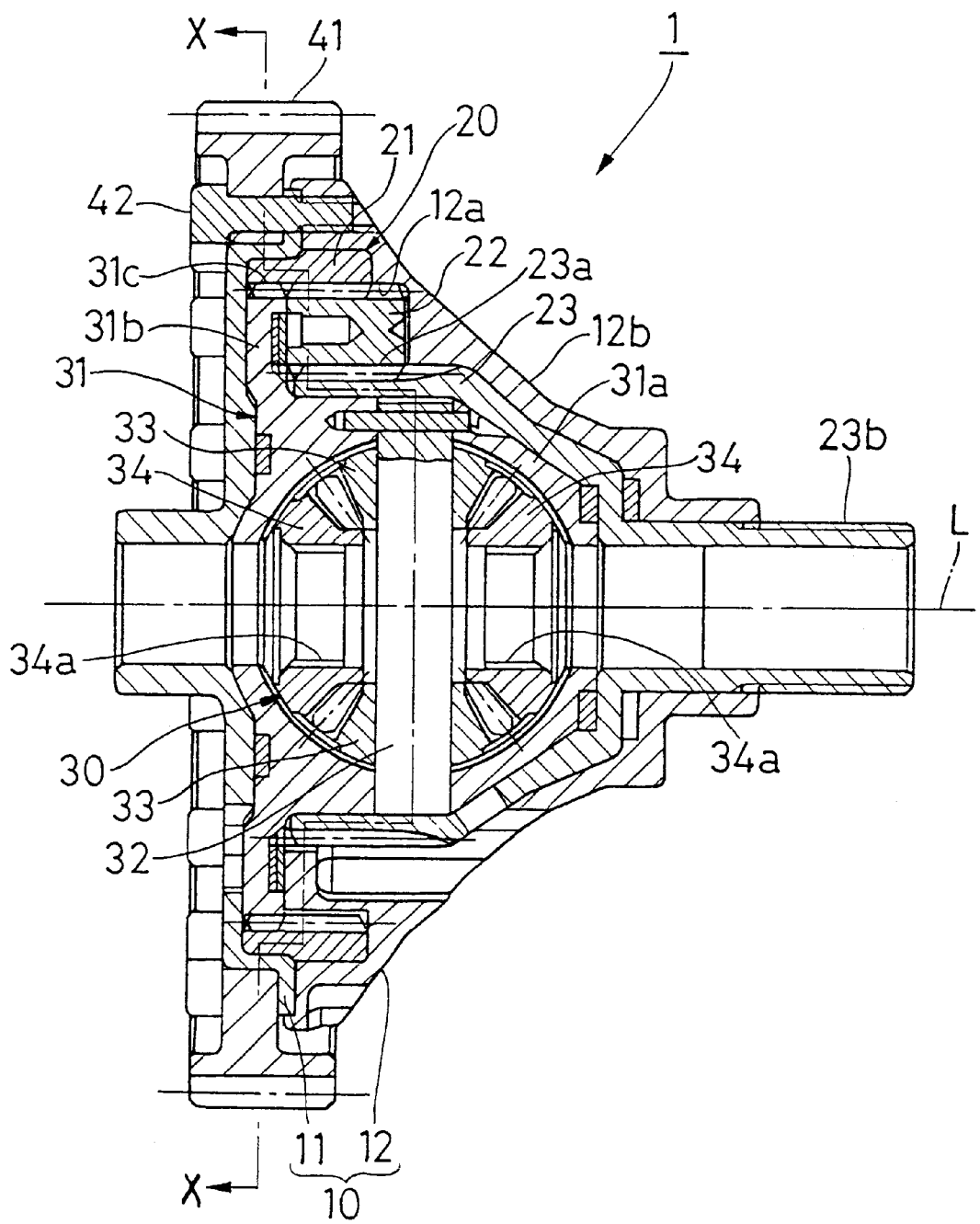
FIG. 1 is a sectional view taken on line Y—Y of FIG. 2, showing a first embodiment of a first mode of the present invention.
Figure 2:
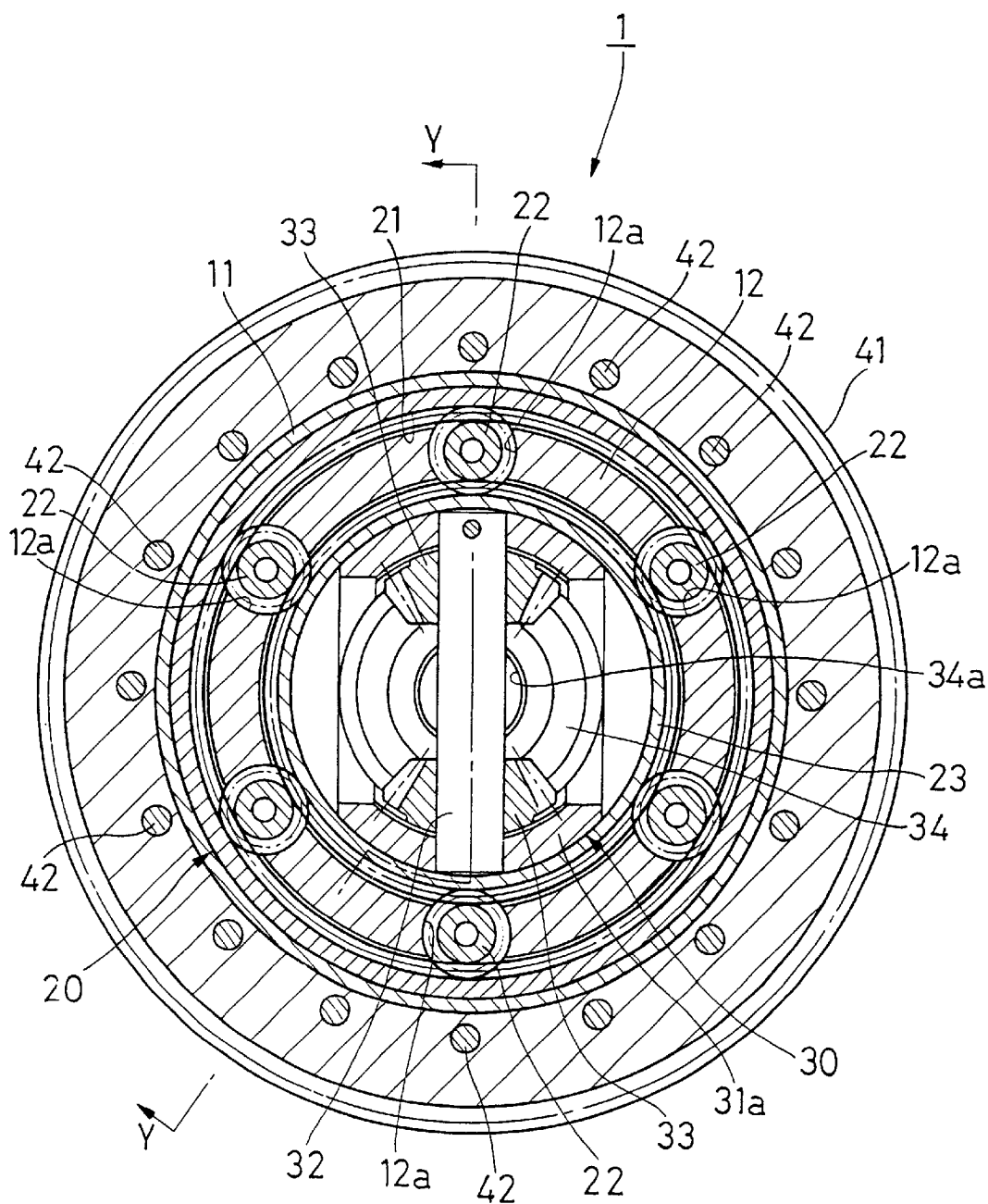
FIG. 2 is a sectional view taken on line X—X of FIG. 1.
Figure 3:
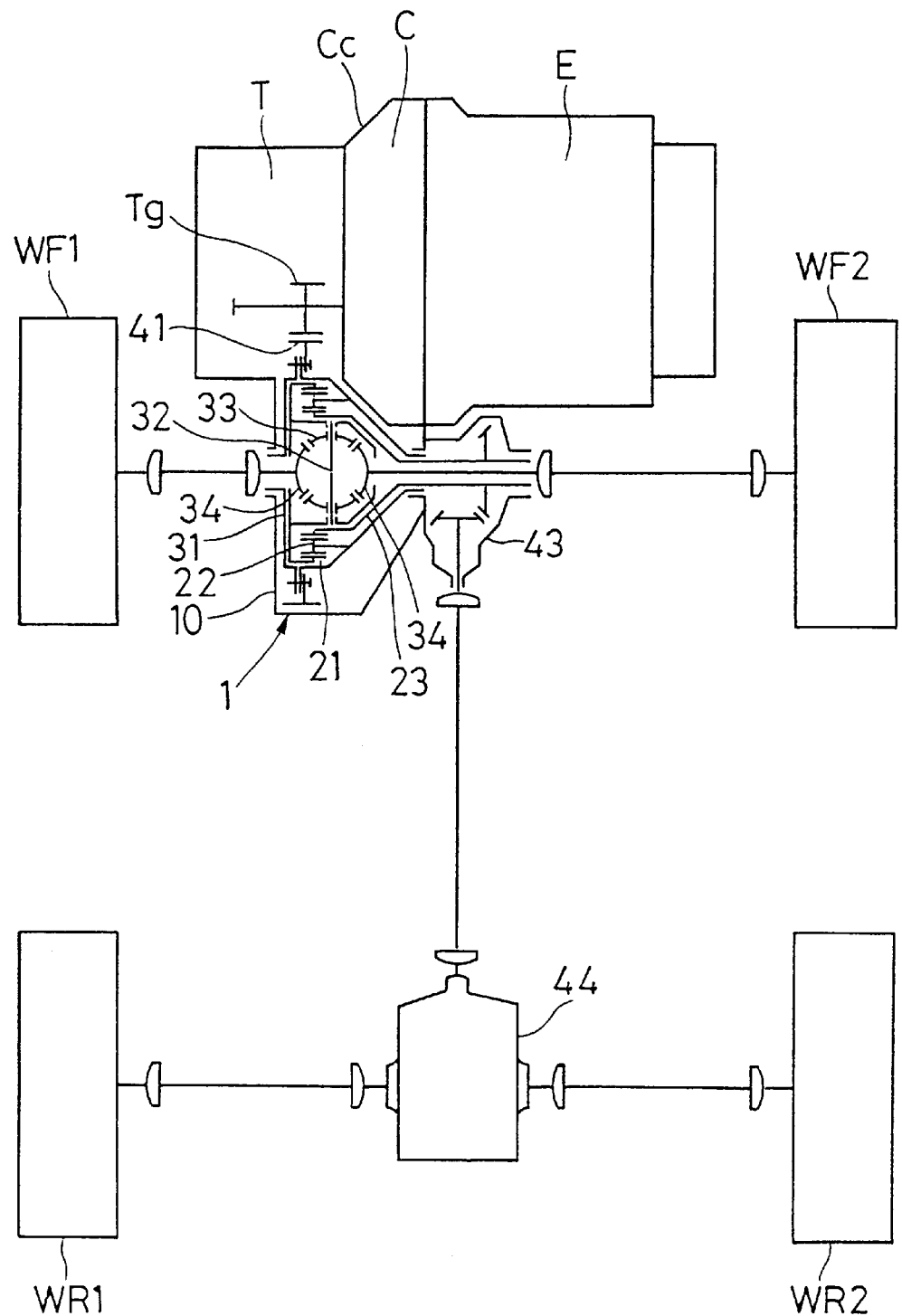
FIG. 3 is a plan view showing a schematic construction of a driving system of a vehicle incorporated with the combined differential gear device of FIGS. 1 and 2.

FIGS. 1 through 3 show a first embodiment of a first mode of the present invention. A combined differential gear device 1 according to this embodiment includes a housing 10 which is rotation-driven about a rotation axis L, and a planetary gear mechanism 20 and a differential gear mechanism 30 which are incorporated in this housing 10.

The housing 10 has two housing component bodies 11, 12. The housing component bodies 11, 12 are arranged in the direction of the rotation axis L in such a manner as to be mutually opposing relation and fixed to each other by a bolt 42. An input gear 41 is fixed to an outer periphery of the housing component body 11 by the bolt 42. As shown in FIG. 3, this input gear 41 is rotation-driven by an output gear Tg of a transmission T. By this, the housing 10 is rotated about the rotation axis L.

The planetary gear mechanism 20 includes an inner gear 21, a planetary gear 22 and a sun gear 23. The inner gear 21 is rotatably disposed within the housing 10 with an axis thereof aligned with the rotation axis L.

The planetary gear 22 is arranged within the housing 10 with an axis thereof in parallel relation to the rotation axis L. At least one such planetary gear is used. In this embodiment, a plurality of planetary gears 22 are used. Those planetary gears 22 are arranged at equal intervals in the circumferential direction of the housing 10. The planetary gears 22 are rotatably received in pockets 12a formed in the housing component body 12. Accordingly, the planetary gears 22 are revolved about the rotation axis L together with the housing 10. Each planetary gear 22 can also rotate about its own axis. The planetary gears 22 are engaged with the inner gear 21.

The sun gear 23 is formed in a cylindrical configuration. The sun gear 23 is rotatably disposed within the housing 10 with an axis thereof aligned with the rotation axis L. One end portion (left end portion in FIG. 1) of the sun gear 23 is inserted in the inner gear 21. An outer gear portion 23a is formed on an outer periphery of one end portion of the sun gear 23. This outer gear portion 23a is engaged with the planetary gear 22. Accordingly, when the planetary gear 22 is not rotated about its own axis, the sun gear 23 is rotated at an equal speed in unison with the inner gear 21. On the other hand, when the planetary gear 22 is rotated about its own axis, the sun gear 23 is rotated at a high speed or low speed in accordance with the speed of rotation of the planetary gear 22 with respect to the inner gear 21. Whether the sun gear 23 is rotated at a high speed or at a low speed depends on the relation between the revolving direction and the rotating direction of the planetary gear 22. At the time the planetary gear 22 is rotated about its own axis, a friction resistance is generated between an outer peripheral surface of the planetary gear 22 and an inner peripheral surface of the pocket 12a. Consequently, differential rotation between the inner gear 21 and the sun gear 23 is limited by an amount equal to the friction resistance, and a magnitude of torque corresponding to the friction resistance is transmitted from the sun gear 23 or inner gear 21 which is rotated at a high speed to the inner gear 21 or sun gear 23 which is rotated at a low speed. The other end portion of the sun gear 23 is projected outside from the housing component body 12. A spline 23b is formed on the other end portion of the sun gear 23. This spline 23b is connected with a rear differential gear device 44 through a rotation transmitting mechanism 43, as later described.

The differential gear mechanism 30 includes a casing 31. This casing 31 is rotatably received within the housing 10 with an axis thereof aligned with the rotation axis L. The casing 31 includes a hollow cylindrical receiving portion 31a and a disc portion 31b. The receiving portion 31a is rotatably received in the sun gear 23 with a radius of curvature thereof aligned with the rotation axis L. The disc portion 31b is projected outside from the sun gear 23 with an axis thereof aligned with the rotation axis L. A gear portion 31c is formed on an outer periphery of the disc portion 31b. This gear portion 31c is engaged with the inner gear 21. The gear portion 31c and the inner gear 21 are engaged with each other in a sort of spline fitting fashion. Accordingly, the casing 31 is rotated in unison with the inner gear 21.

A support shaft 32 orthogonal to the rotation shaft L is fixed to a central area of the receiving portion 31a. Element gears 33, 33 are rotatably supported on opposite end portions of the support shaft 32 within the receiving portion 31a. Accordingly, each element gear 33 can revolve about the rotation axis L and can also rotate about the support shaft 32. Although a plurality of element gears 33 are used, only one may be used. Although a bevel gear is used as the element gear 33, a spur gear or helical gear may be used as in the known parallel differential gear device. In that case, the spur gear or helical gear is arranged in parallel relation to the rotational axis L.

A pair of side gears 34, 34 are rotatably received in the receiving portion 31a with their axes aligned with the rotational axis L. Each side gear 34 is engaged with the element gears 33. Accordingly, when the element gear 33 is not rotated about its own axis in the event the casing 31 is rotated together with the inner gear 21, the pair of side gears 34, 34 are rotated at an equal speed. On the other hand, when the element gear 33 is rotated about its own axis, the pair of side gears 34, 34 are rotated at mutually different speed. A spline hole 34a is formed in a central area of each side gear 34. Left and right front wheels WF1, WF2, as later described, are connected to the corresponding spline holes 34a, 34a.

A chamfering 12b about the rotation axis L is formed on an outer surface of the housing component body 12. This chamfering 12b is dimensioned large enough to install the combined differential gear device 1 on a front wheel drive vehicle having a transverse engine without any problem. That is, in this combined differential gear device 1, since the differential gear mechanism 30 is incorporated in the sun gear 23, the sun gear 23 becomes comparatively large in diameter. The inner gear 21 also becomes large in diameter corresponding to this. However, the inner gear 21 and the sun gear 23 are arranged on the outer side and on the inner side in a radial direction of the housing 10 and are not arranged side by side in the direction of the rotation axis L. Accordingly, the width dimension of an outer periphery side portion of the housing 10 can be reduced in the direction of the rotation axis L. Although the two side gears 34, 34 of the differential gear mechanism 30 are arranged side by side in the direction of the rotation axis L, the outside diameter of each side gear 34 is small. Accordingly, the width dimension of the outer periphery side portion of the housing 10 does not become large in the direction of the rotation axis L by receiving the two side gears 34, 34 in the housing 10, although the width of the inner periphery side of the housing 10 becomes large in the direction of the rotation axis L. As discussed, the width dimension of the housing 10 in the direction of the rotation axis L can be reduced on the outer periphery side, although the width dimension is increased on the inner periphery side. Accordingly, a large chamfering 12b can be formed on the housing 10.

As shown in FIG. 3, the combined differential gear device 1 is attached to a vehicle (not shown) with its chamfering 12b placed in opposing relation to a chamfering Cc of the torque converter or clutch C. The sun gear 23 of the planetary gear mechanism 20 is connected to the rear differential gear device 44 through the rotation transmitting mechanism 43 and then connected to left and right rear wheels WR1, WR2 from the rear differential gear device 44. The pair of side gears 34, 34 of the differential gear mechanism 30 are connected to the left and right front wheels WF1, WF2, respectively. Accordingly, a part of a rotation torque of an engine E transmitted to the combined differential gear device 1 through the torque converter or clutch C, an output gear Tg of the transmission T and an input gear 41 is transmitted to the left and right rear wheels WR1, WR2 through the planetary gear 22, the sun gear 23, the rotation transmitting mechanism 43 and the rear differential gear device 44. A part of the remaining rotation torque of the engine E is transmitted to the left and right front wheels WF1, WF2 through the planetary gear 22, the inner gear 21, the casing 31, the support shaft 32, the element gear 33 and the side gears 34, 34.

Figure 4:
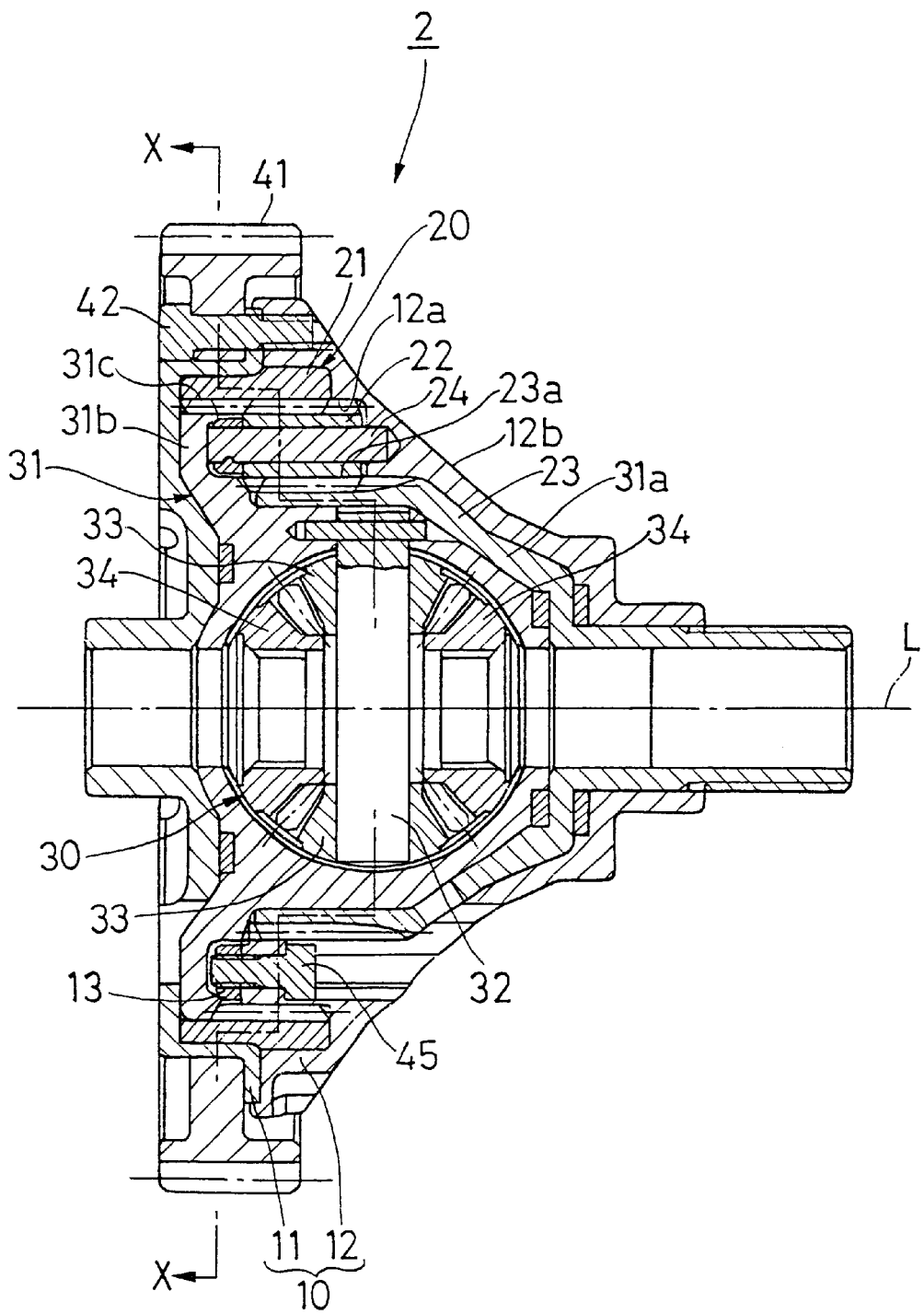
FIG. 4 is a sectional view taken on Line Y—Y of FIG. 5, showing a second embodiment of the first mode of the present invention.
Figure 5:
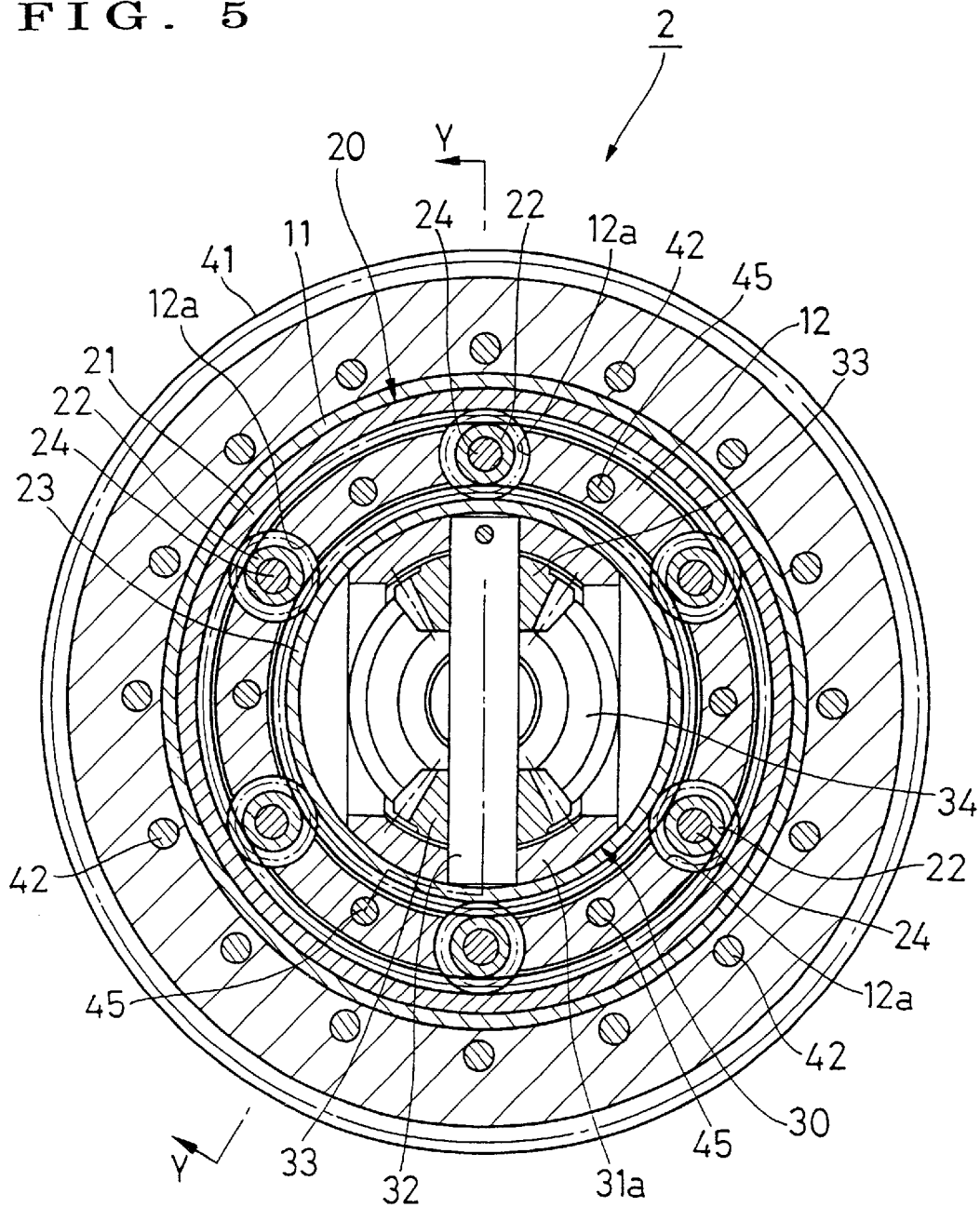
FIG. 5 is a sectional view taken on line X—X of FIG. 4.

FIGS. 4 and 5 show a second embodiment of the first mode of the present invention. In a combined differential gear device 2 according to this second embodiment, a support ring 13 forming a part of a housing 10 is fixed, by a bolt 45, to an end face of a housing component body 12 facing a component body 11 side. One and the other end portions of a shaft 24 extending in parallel relation to a rotation axis L are supported, respectively, by the support ring 13 and the housing component body 12. A planetary gear 22 is rotatably supported through this shaft 24. Accordingly, in this combined differential gear device 2, when the planetary gear 22 is rotated about its own axis, almost none of friction resistance is generated between the planetary gear 22 and the housing 10 and differential rotation between the inner gear 21 and the sun gear 23 is not limited. All the remaining construction is same as the above-mentioned combined differential gear device 1.

Figure 6:
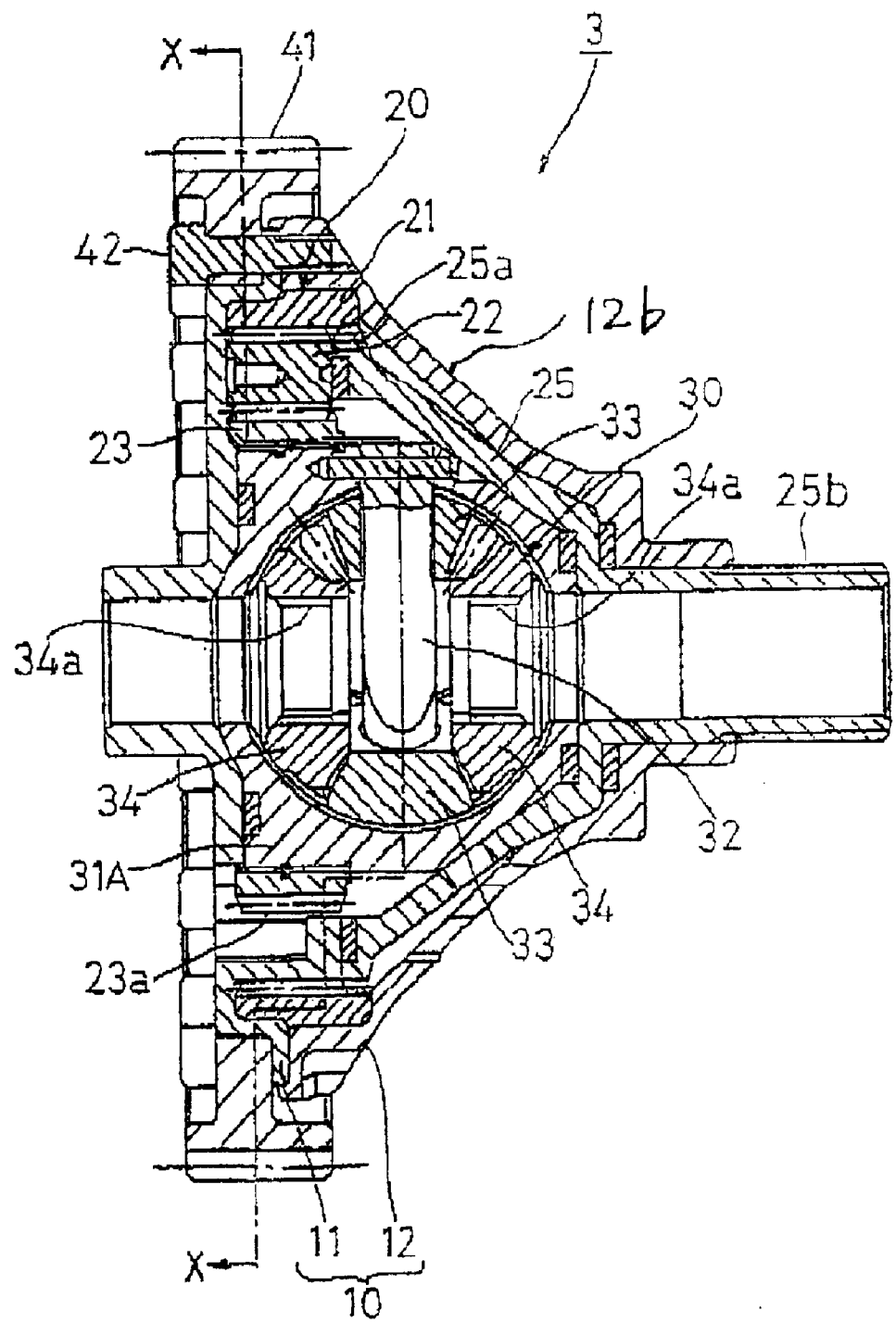
FIG. 6 is a sectional view taken on line Y—Y of FIG. 7, showing a first embodiment of a second mode of the present invention.
Figure 7:
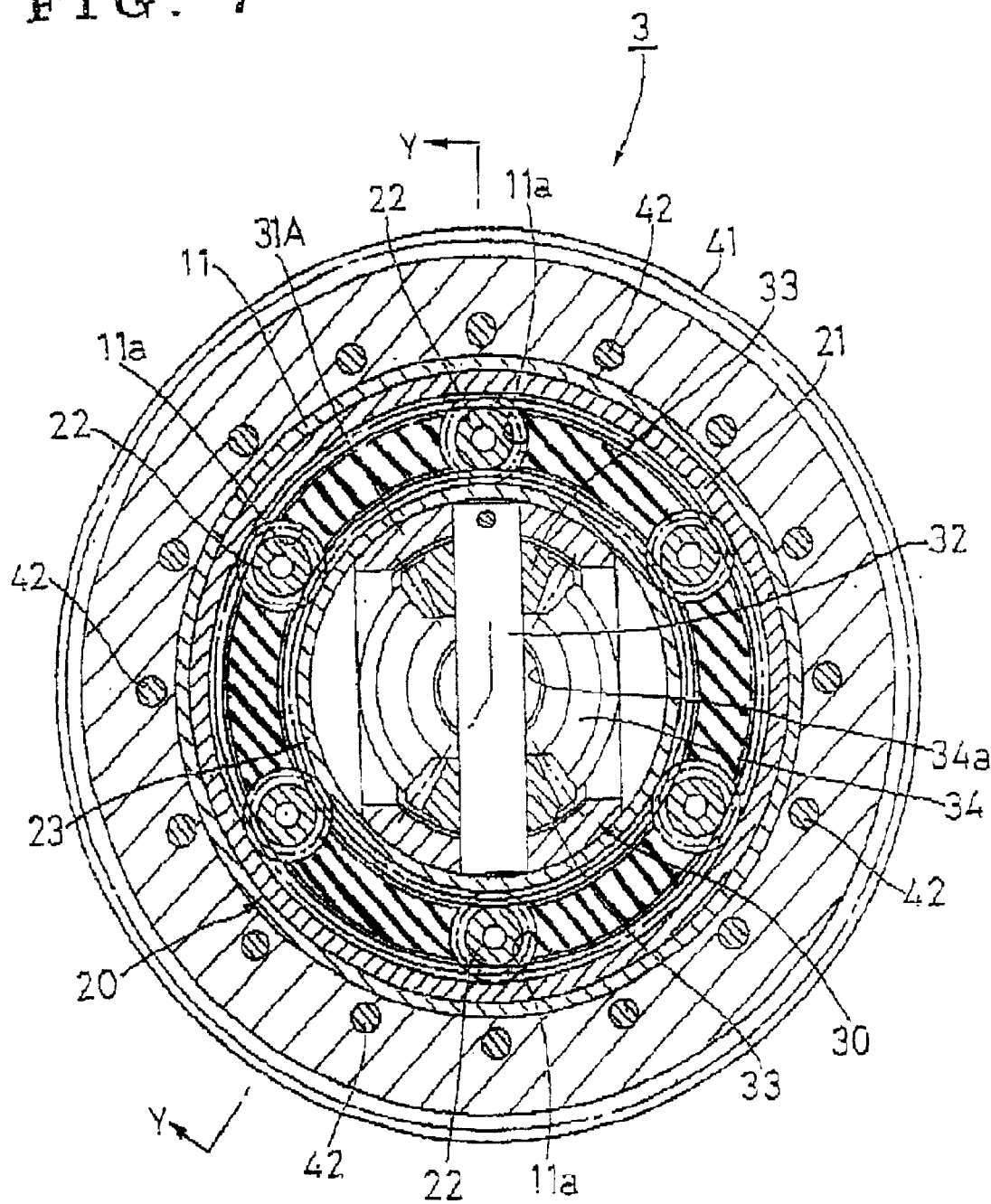
FIG. 7 is a sectional view taken on line X—X of FIG. 6.

FIGS. 6 and 7 show one embodiment of a second form of the present invention. In a combined differential gear device 3 according to this embodiment, a cylindrical rotation transmitting member 25 is rotatably disposed within a housing 10 with its axis aligned with a rotation axis L. A gear portion 25a is formed on one end portion of this rotation transmitting member 25. The gear portion 25a is engaged with an inner gear 21 in a spline fitting fashion. Accordingly, the rotation transmitting member 25 is rotated in unison with the inner gear 21. The other end portion of the rotation transmitting member 25 is projected outside from the housing 10. A spline portion 25b, instead of the spline portion 23b of the sun gear 23 in the above-mentioned embodiment, is formed on the projected part of the rotation transmitting member 25. This spline portion 25b is connected with a rear differential gear device 44 through a rotation transmitting mechanism 43.

A pocket 11a, instead of the pocket 12a formed in the housing component body 12 of the above-mentioned embodiment, is formed in the housing component body 11. A planetary gear 22 is rotatably received in this pocket 11a. It is accepted that the housing component body 11 is provided with a shaft extending in parallel relation to the rotation axis L and the planetary gear 22 is disposed on this shaft.

The sun gear 23 is formed as a ring gear having an outer gear portion 23a. A casing 31A, instead of the casing 31, is non-rotatably connected, by means of spline fitting or the like, to an inner periphery of the sun gear 23. A pair of element gears 33, 33 and a pair of side gears 34, 34 are received in the casing 31A in the same manner as in the above-mentioned embodiment. All the remaining construction is same as the above-mentioned combined differential gear device 1.

Figure 8:
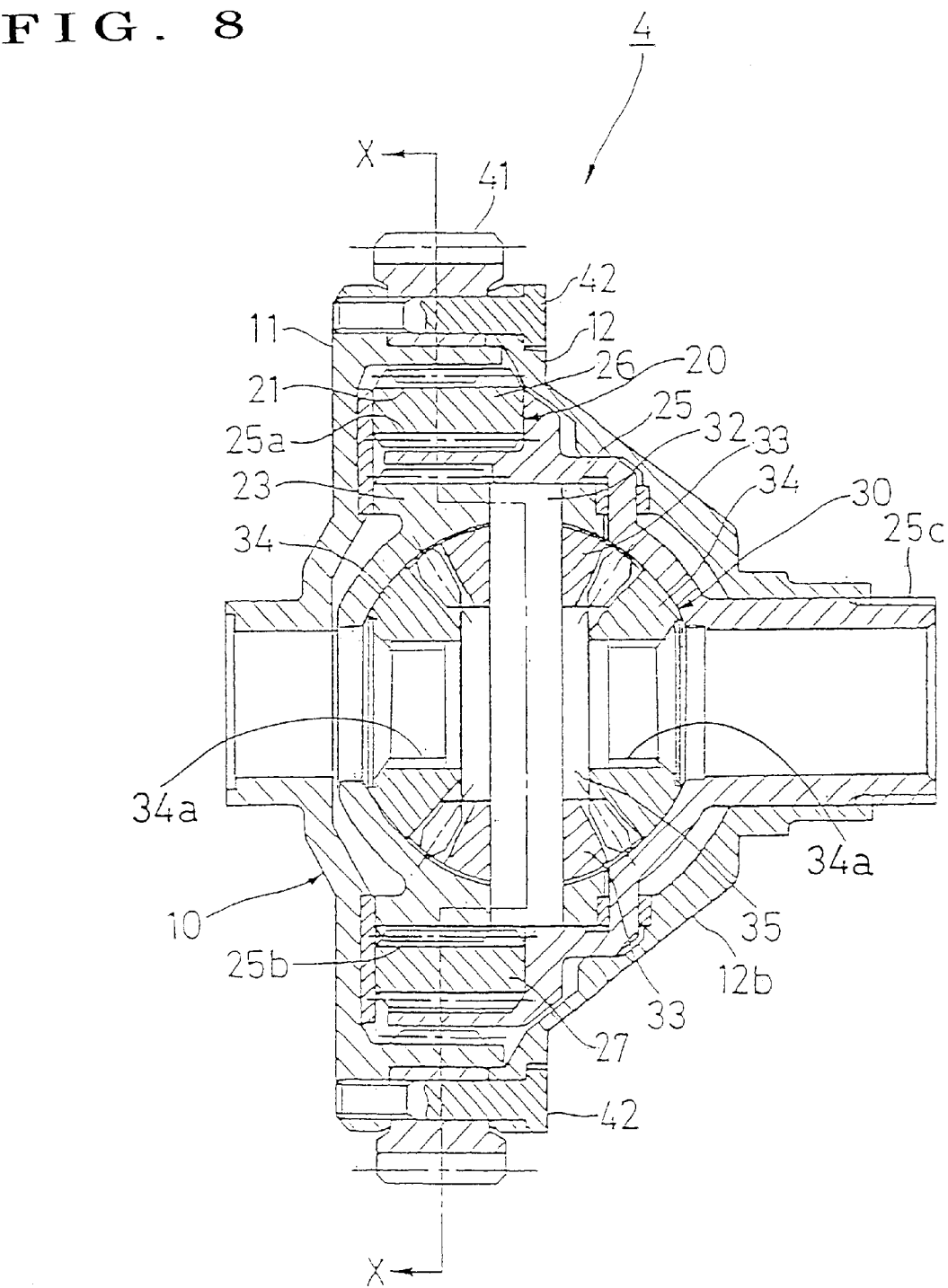
FIG. 8 is a sectional view taken on line Y—Y of FIG. 9, showing a first embodiment of a third mode of the present invention.
Figure 9:
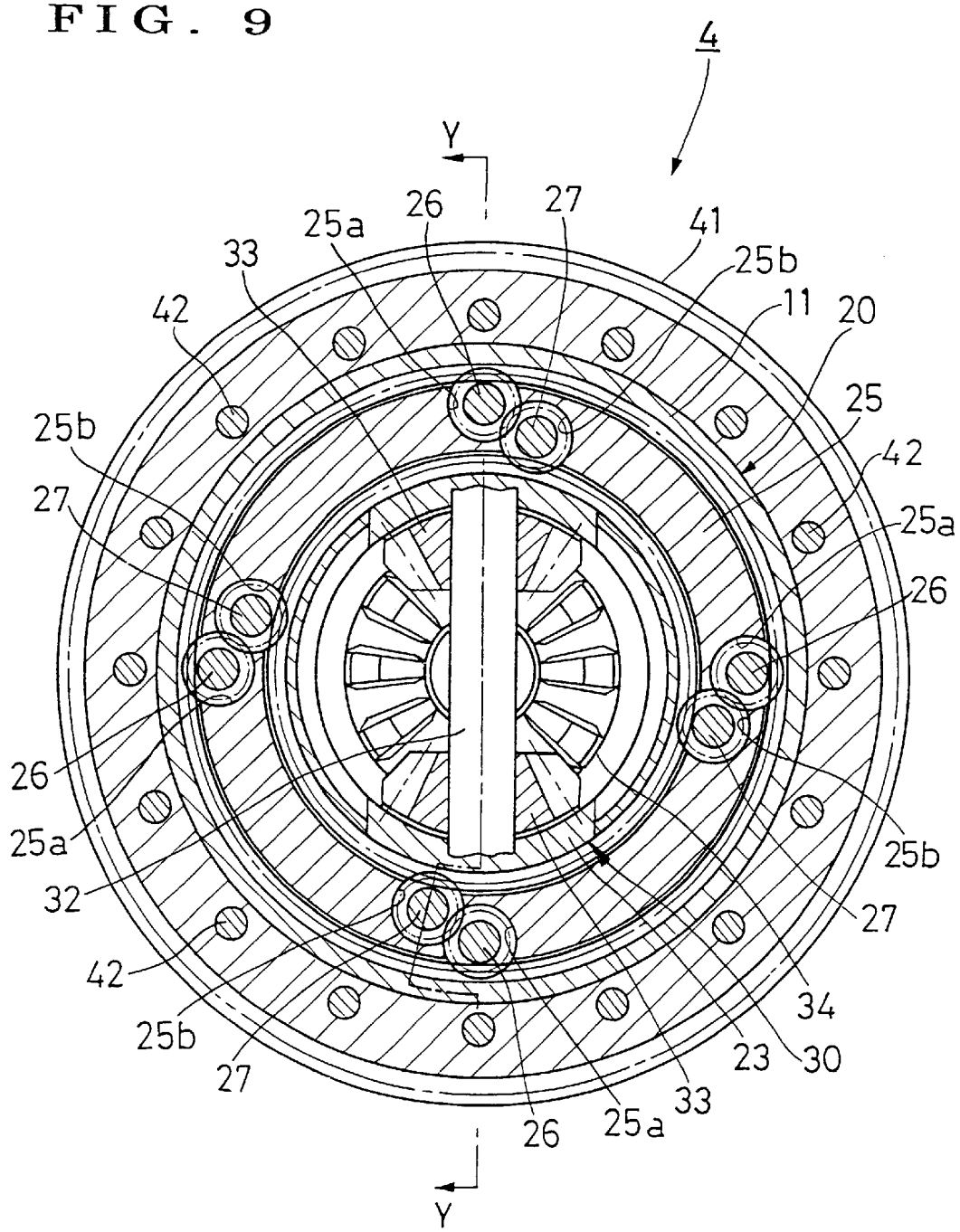
FIG. 9 is a sectional view taken on line X—X of FIG. 8.

FIGS. 8 and 9 show one embodiment of a third mode of the present invention. In a combined differential gear device 4 according to this embodiment, an inner gear 21 of a planetary gear mechanism 20 is integrally formed on an inner periphery of a housing component body 11. It is also accepted that the inner gear 21 is separately formed from the housing component body 11 and fixed to the housing component body 11 by fixing means such as a bolt. The planetary gear mechanism 20 includes a carrier 25. This carrier 25 is rotatably supported on the housing 10 with its axis aligned with a rotation axis L. One end portion (left end portion in FIG. 8) of the carrier 25 is located within the inner gear 21. At least a pair of pockets 25a, 25b extending in parallel relation to the rotation axis L are formed in this end portion. In this embodiment, four pockets 25a, 25b are formed and arranged at equal intervals in a circumferential direction of each carrier 25. The pair of pockets 25a, 25a are communicated with each other. The pocket 25a is arranged more on an outer periphery side of the carrier 25 than the other pocket 25b and open to the outer periphery of the carrier 25. The other pocket 25b is open to an inner periphery of the carrier 25. The other end portion of the carrier 25 is projected outside from a housing component body 13, and a spline 25c is formed on this projected part. The spline 25c is connected with a rear differential gear device through a rotation transmitting device 43.

Planetary gears 26, 27 are rotatably inserted in the pockets 25a, 25b, respectively. Accordingly, the planetary gears 26, 27 can be revolved about the rotation axis L together with the carrier 25 and can also be rotated about their own axes. The two planetary gears 26, 27 are engaged with each other. The planetary gear 26 is engaged with the inner gear 21, and the other planetary gear 27 is engaged with the sun gear 23. Accordingly, when the planetary gears 26, 27 are not rotated about their own axes, the carrier 25 and the sun gear 23 are rotated at an equal speed in unison with the housing 10. When the planetary gears 26, 27 are rotated about their own axes, the carrier 25 and the sun gear 23 make a differential rotation. The differential rotation between the carrier 25 and the sun gear 23 is limited by an amount equal to the friction resistance generated between each outer peripheral surface of the planetary gears 26, 27 and each inner peripheral surface of the pockets 25a, 25b. The amount of differential limitation becomes larger than that in the combined differential gear device 1 by a portion resulting from employment of two planetary gears 26, 27.

A spherical receiving chamber 35 is defined by an inner peripheral surface of the sun gear 23 and an inner peripheral surface of the carrier 25. The center of curvature of the inner surface of this receiving chamber 35 is located on the rotation axis L. The element gears 33, 33 and the side gears 34, 34 are arranged in the receiving chamber 35. The element gears 33, 33 are rotatably supported on a support shaft 32 disposed at the sun gear 23. The side gears 34, 34 are connected to left and right front wheels WF1, WF2. All the remaining construction is same as the above-mentioned combined differential gear device 1.

Figure 10:
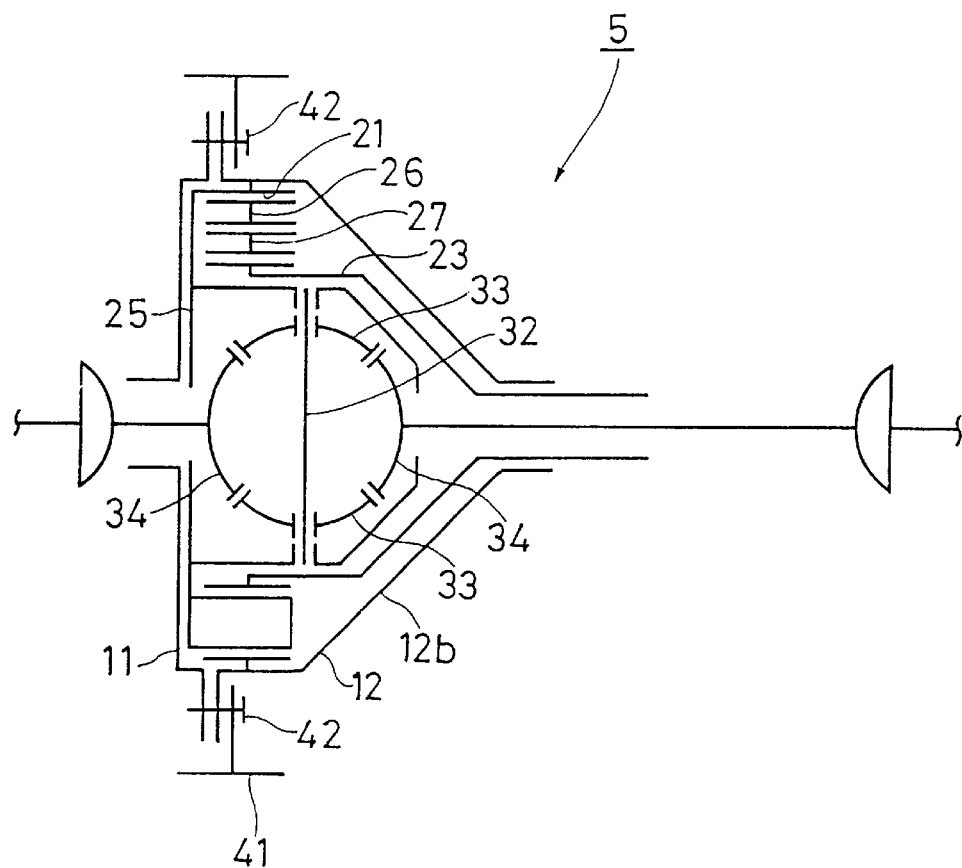
FIG. 10 is a plan view showing a schematic construction of a first embodiment of a fourth mode of the present invention.

FIG. 10 shows one embodiment of a fourth mode of the present invention. In a combined differential gear device 5 according to this embodiment, a carrier 25 is connected to an inner gear 21 so as to be rotated in unison with the inner gear 21. A part of the carrier 25 is inserted in a sun gear 23, and this part of the carrier 25 is provided with a hollow. A pair of element gears 33, 33 and a pair of side gears 34, 34 are arranged in the hollow portion of the carrier 25. One end portion of the sun gear 23 is projected outside from a housing 10, and a rear differential gear device is connected to the projected portion of the sun gear 23 through a rotation transmitting mechanism as in the above-mentioned combined differential gear device 1. All the remaining construction is same as the above-mentioned combined differential gear device 4.

INDUSTRIAL APPLICABILITY

A combined differential gear device according to the present invention is not only used as a center and a rear differential gear device of a four-wheel drive vehicle having a front transverse engine but also used as a center and a rear differential gear device of a four-wheel drive vehicle having a rear transverse engine.

What is claimed is:

1. A combined differential gear device comprising:
    a hollow housing (10) composed of a first housing component body (11) and a second housing component body (12), said housing (10) being configured to be rotationally driven about a rotational axis (L) by a rotational force from an engine (E);
    an inner gear (21) disposed within said housing (10) and rotatable relative thereto about the rotational axis (L);
    a sun gear (23) disposed within said housing (10) and rotatable relative to thereto about the rotational axis (L), a part of said sun gear (23) being configured to be arranged inside of said inner gear (21);
    plural planetary gears (22) disposed between said inner gear (21) and said sun gear (23), and rotatable relative to said housing (10) about the rotational axis (L), each of said plural planetary gears (22) being configured to be revolved about its own revolving axis and to be gear-engaged with respective of said inner gear (21) and said sun gear (23);
    plural pockets (12a) formed in said second housing component body (12) in which said plural planetary gears (22) are disposed respectively, each of said plural pockets (12a) being configured to frictionally contact an inner peripheral surface thereof with an outer peripheral surface of said planetary gears (22);
    a hollow casing (31) disposed in said housing (10) and rotatable together with said inner gear (21) about the rotational axis (L); and
    a differential gear mechanism (30) disposed in said casing (31) and arranged inside of said sun gear (23) so as to rotate together with said inner gear (21) and said casing (31) about the rotational axis (L).

2. A combined differential gear device according to claim 1, said differential gear mechanism (30) further comprising:
    at least one element gear (33) disposed within said casing (31) and rotatable about its own rotational axis orthogonal to the rotational axis (L), said element gear (33) being configured to be revolvable about the rotational axis (L) together with said casing (31); and
    a pair of side gears (34) rotatably disposed within said casing (31) about the rotational axis (L) and engaged with said at least one element gear (33).

3. A combined differential gear device according to claim 2, wherein bevel gears are used as said element gear (33) and at least one of said side gears (34).

4. A combined differential gear device according to claim 1, further comprising:
    a tapered chamfering (12b) formed on an outer peripheral surface of said housing (10).

5. A combined differential gear device according to claim 4, wherein said tapered chamfering (12b) is formed on the outer peripheral surface of said second housing component body (12) of said housing (10).

6. A combined differential gear device according to claim 1, wherein said inner gear 21 is engaged with said casing (31) through a gear portion (31c) formed thereon.

7. A combined differential gear device according to claim 1, wherein one end of said sun gear (23) is engaged with said planetary gear (22) through an outer gear portion (23a) of said sun gear (23), and the other end thereof is projected outside from said housing (10).

8. A combined differential gear device (1) according to claim 1,
    wherein the rotational force from the engine (E) is divided through the planetary gear (22) to said inner gear (21) and said sun gear (23); and
    wherein the rotational force divided to said inner gear (21) is further divided to two parts through said differential gear mechanism (30).

9. A combined differential gear device comprising:
    a hollow housing (10) composed of a first housing component body (11) and a second housing component body (12), said housing (10) being configured to be rotationally driven about a rotational axis (L) by a rotational force from an engine (E);
    an inner gear (21) disposed within said housing (10) and rotatable relative thereto about the rotational axis (L);
    a sun gear (23) disposed within said housing (10) and rotatable relative to thereto about the rotational axis (L), a part of said sun gear (23) being configured to be arranged inside of said inner gear (21);
    plural planetary gears (22) disposed between said inner gear (21) and said sun gear (23), and rotatable relative to said housing (10) about the rotational axis (L), each of said plural planetary gears (22) being configured to be revolved about its own revolving axis and to be gear-engaged with respective of said inner gear (21) and said sun gear (23);
    plural pockets (11a) formed in said first housing component body (11) in which said plural planetary gears (22) are disposed respectively, each of said plural pockets (11a) being configured to frictionally contact an inner peripheral surface thereof with an outer peripheral surface of said planetary gears (22);
    a hollow casing (31A) disposed in said housing (10) and rotatable together with said sun gear (23) about the rotational axis (L); and
    a differential gear mechanism (30) disposed in said casing (31A) and rotatable together with said sun gear (23) and said casing (31A) about the rotational axis (L).

10. A combined differential gear device according to claim 9, said differential gear mechanism (30) further comprising:
    at least one element gear (33) disposed within said casing (31) and rotatable about its own rotational axis orthogonal to the rotational axis (L), said element gear (33) being configured to be revolvable about the rotational axis (L) together with said casing (31); and
    a pair of side gears (34) rotatably disposed within said casing (31) about the rotational axis (L) and engaged with said at least one element gear (33).

11. A combined differential gear device according to claim 10, wherein bevel gear are used as said element gear (33) and at least one of said side gears (34).

12. A combined differential gear device according to claim 9, further comprising:

a tapered chamfering (12b) formed on an outer peripheral surface of said housing (10).

13. A combined differential gear device according to claim 12, wherein said tapered chamfering (12b) is formed on the outer peripheral surface of said second housing component body (12) of said housing (10).

14. A combined differential gear device according to claim 9, further comprising:

a cylindrical rotation transmitting member (25) rotatably disposed in said housing (10) about the rotational axis (L), wherein one end thereof is engaged with said inner gear (21) and the other end thereof is projected outside from said housing (10).

15. A combined differential gear device according to claim 14, wherein said one end of said cylindrical rotation transmitting member (25) is engaged with said inner gear (21) through a gear portion (25a) formed onto said cylindrical rotation transmitting member (25).

16. A combined differential gear device according to claim 14, wherein the rotational force from the engine (E) is divided through the planetary gear (22) to said inner gear (21) and said sun gear (23);

wherein the rotational force divided to said inner gear (21) is transmitted to said cylindrical rotation transmitting member (25); and wherein the rotational force divided to said sun gear (23) is further divided to two parts through said differential gear mechanism (30).

* * * * *